Dec. 8, 1970        J. L. HARP, JR        3,545,211
                    RESONANT PULSE ROCKET
Filed Jan. 27, 1967                       3 Sheets-Sheet 1
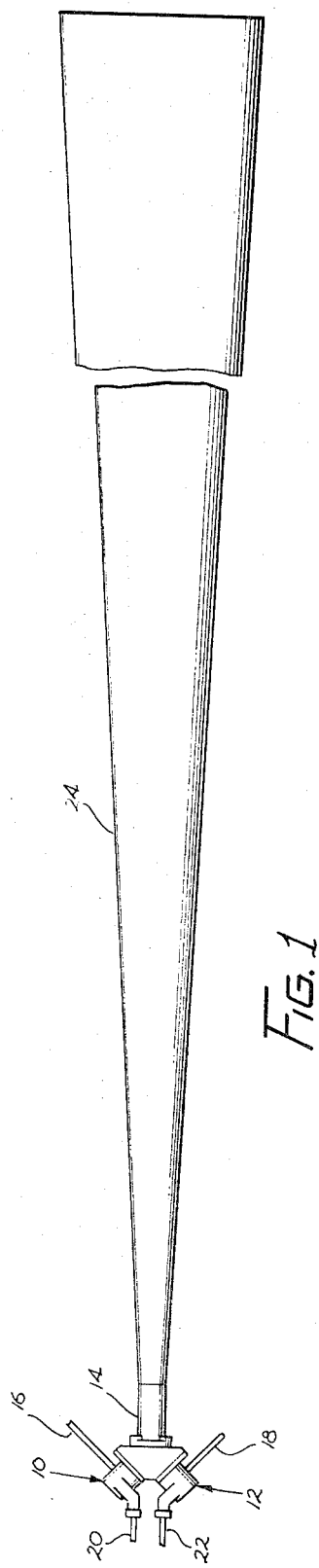
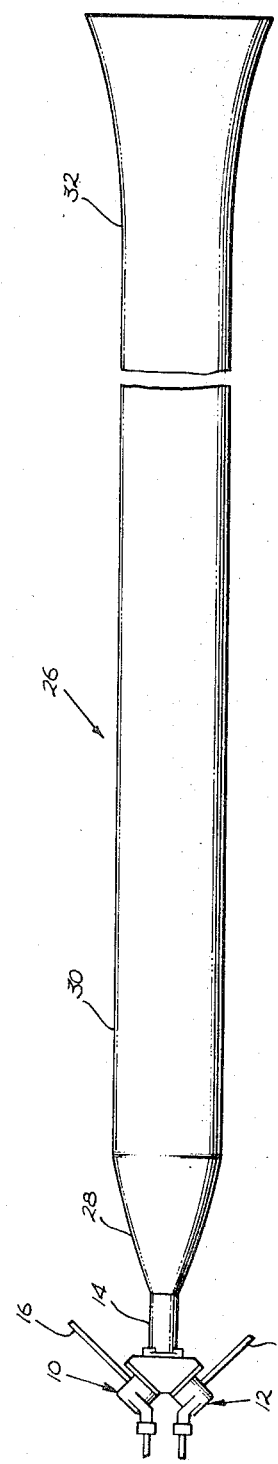
INVENTOR.
JAMES L. HARP, JR.
BY
R. E. Geaugue
ATTORNEY Dec. 8, 1970   J. L. HARP, JR   3,545,211
RESONANT PULSE ROCKET
Filed Jan. 27, 1967   3 Sheets-Sheet 2

JAMES L. HARP, JR.
INVENTOR.

BY R. S. Sceangue
ATTORNEY

United States Patent Office 3,545,211
Patented Dec. 8, 1970

3,545,211
RESONANT PULSE ROCKET
James L. Harp, Jr., Canoga Park, Calif., assignor to The Marquardt Corporation, Van Nuys, Calif., a corporation of California
Filed Jan. 27, 1967, Ser. No. 612,200
Int. Cl. F02k 9/00, 7/04
U.S. Cl. 60—247                                                4 Claims

ABSTRACT OF THE DISCLOSURE

A resonant pulse rocket having a pair of injectors for injecting fuel and oxidizer into a combustion chamber and a nozzle connected with the combustion chamber. The nozzle is mated to the propulsion system and the injecting system is pulsed at about the resonant frequency of the complete pulse rocket.

---

This invention relates to a pulse rocket and, more particularly, to a resonant pulse rocket having greater thrust than those heretofore known.

As is well known, pulse rockets are rockets in which fuel is injected into a combustion chamber periodically, in which chamber it ignites and is ejected through a nozzle. Such a conventional rocket motor has the lowest weight per pound of thrust of any known propulsion system, but it also has the lowest fuel specific impulse (ISP). Theoretically, large gains in ISP could be obtained, especially at low altitudes and low flight speeds, if part of the energy in the rocket motor exhaust gases could be used to accelerate the surrounding ambient air. The present invention provides a rocket propulsion system which takes advantage of air as well as rocket fuel to propel a rocket.

Basically, the present invention comprises a combustion chamber, a pair of high speed propellant injectors for injecting pressurized liquid fuel and oxidizer into the combustion chamber and an ejection nozzle. The pressurized fuel and oxidizer can react hypergolically so that no spark is necessary to cause their reaction. The injectors are opened and closed rapidly in a pulsing mode by actuator circuitry that controls the pulse repetition rate and the pulse time duration. The injectors are moved simultaneously by the actuator circuitry, and each injector contains a passage which is in full communication with the combustion chamber at one portion of a cycle and is fully shut off over the remainder of the cycle. While various hypergolic propellants may be used, the invention is not limited to the use of any particular propellants, and it has been found that monomethylhydrazine ($CN_2H_6$) for fuel and nitrogentetroxide ($N_2O_4$) as oxidizer are satisfactory.

The present invention solves the problem of low specific impulse by mating an ejection nozzle to the propulsion system and pulsing the injection system at the resonant frequency of the overall pulse rocket. Thus, air is ejected from the nozzle by the reaction of the hypergolic fuels, and after the air is ejected from the nozzle, a low pressure, or partial vacuum, is created within the nozzle which draws ambient air into the nozzle before the next firing cycle starts. It has been found that with such an arrangement and method of use, the ISP of a pulse rocket can be increased by a large factor without the use of additional fuel.

The invention will be better understood from the following description, taken in conjunction with the accompanying drawings, in which:

FIGS. 1 and 2 are plan views of two nozzles constructed in accordance with the invention;

Figure 8:
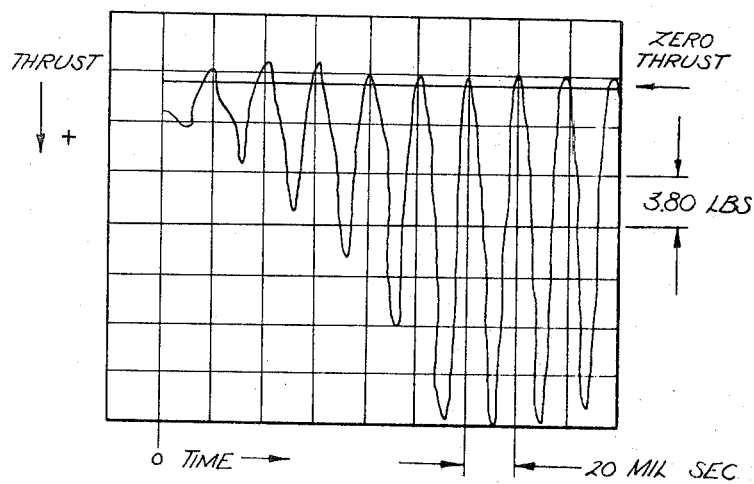
Figure 9:
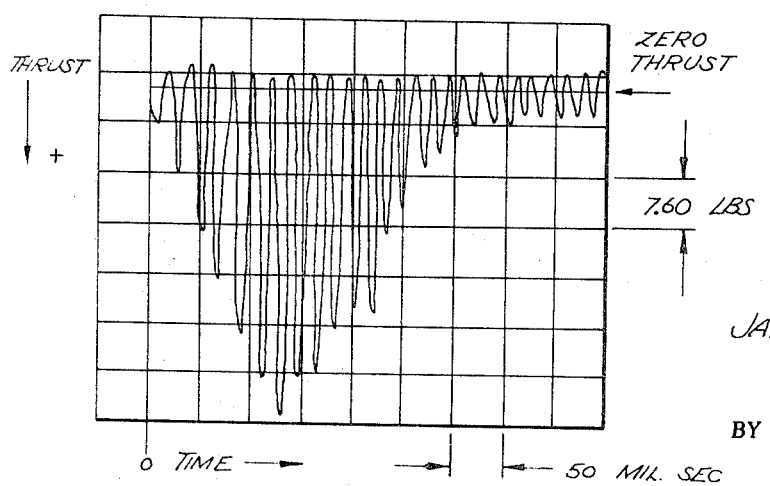

FIGS. 4(a) through 7(a) diagrammatically illustrate the operating sequence of the pulse rocket of the invention;

FIGS. 4(b) through 7(b) illustrate in graphic form the pressure variations corresponding to the operating sequence shown in FIGS. 4(a) through 7(a); and FIGS. 8 and 9 are reproductions of oscillograph traces useful in understanding the invention.

FIGS. 1 and 2 illustrate two pulse rockets constructed in accordance with the invention. FIG. 1 shows a rocket comprising a pair of high speed propellant injectors 10 and 12 for respectively injecting liquid fuel and oxidizer into a combustion chamber 14.

Figure 3:
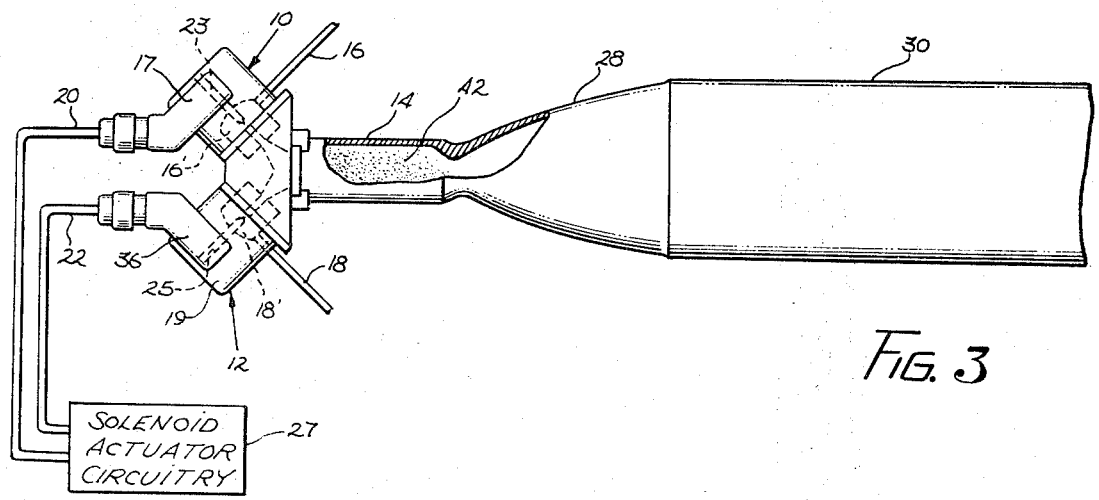
FIG. 3 is a plan view of a portion of the apparatus shown in FIG. 2, showing its internal construction more clearly.

For example, liquid fuel may be supplied through a line 16 to a manifold 16′ and oxidizer supplied through a line 18 to a manifold 18′. Opening and closing (pulsing) of the injectors 10 and 12 is controlled by solenoids 17 and 19, respectively, energized through conductors 20 and 22 by solenoid actuator circuitry 23 (FIG. 3). When the two injectors 10 and 12 are pulsed simultaneously, the valves 23 and 25, respectively, are moved outwardly to connected manifold 16′ and 18′ to the combustion chamber 14. The injectors are only illustrated diagrammatically since any suitable injector structure can be utilized (such as illustrated in U.S. Patent No. 3,178,884) which is capable of injecting propellants at the desired frequency. Similarly, the solenoid actuator circuitry 27 may be of the type described in said patent.

In FIG. 1, the combustion chamber 14 is connected to an ejection nozzle 24 which, is conical, and has its smaller diameter end secured to the combustion chamber. The embodiment shown in FIG. 2 is quite similar to that shown in FIG. 1 except that its ejection nozzle 26 includes a conical section 28 adjacent the combustion chamber 14, a straight cylindrical section 30 secured to the larger end of the conical section 28 and a bell-shaped or flared portion 32 connected to the outer end of the cylindrical portion 30. The embodiment shown in FIG. 2 utilizes the same injectors that are utilized in the embodiment shown in FIG. 1.

FIG. 3 shows the injectors and combuston chamber of the pulse rocket in more detail than is shown in FIGS. 1 and 2. Although the injectors are shown as applied to the embodiment of FIG. 2, it is to be understood that they are equally applicable to the embodiment shown in FIG. 1. As is well known, hypergolic propellants ignite upon contact with each other and no spark or other ignition means is required. However, an ignition means can be provided for fuel and oxidizer which must be ignited.

Combustion of propellants takes place in chamber 14, resulting in combustion products 42, and creates a shock wave that travels outwardly (to the right, as seen in FIG. 3) toward the open end of the rocket nozzle. Thus, an interface is created between the expanding propellants and the ambient air that has filled the rocket nozzle. The air is expelled from the nozzle at great velocity, followed by the propellant, to obtain thrust that is at least several fold the amount of that obtainable with prior art pulse rockets.

Figure 4:
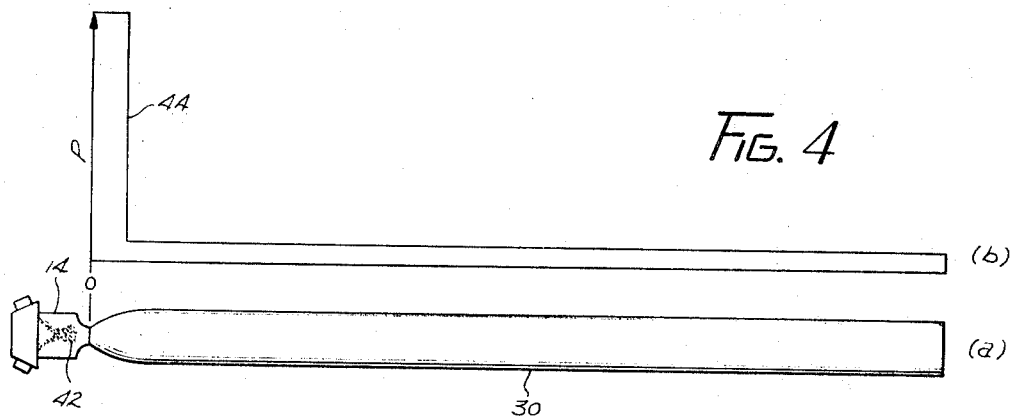
Figure 5:
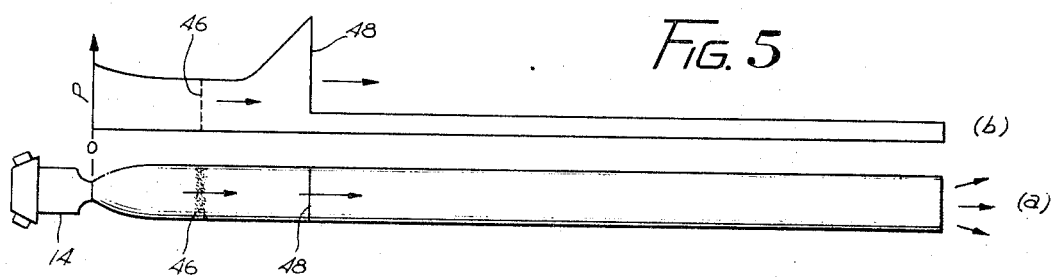
Figure 6:
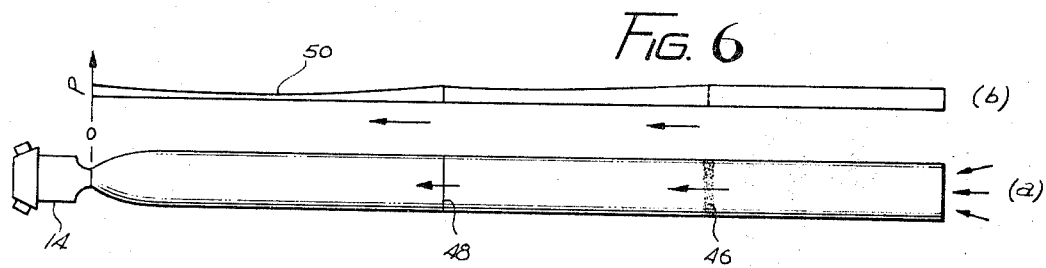
Figure 7:
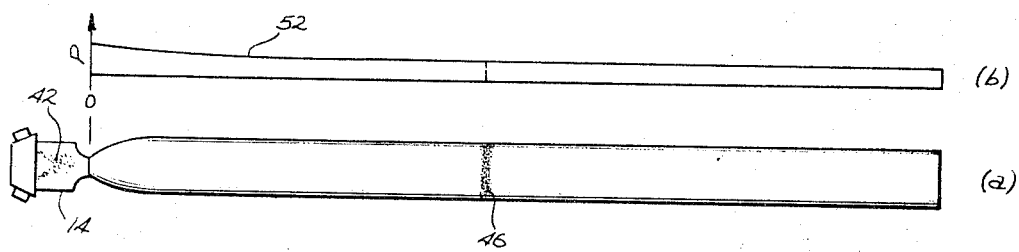

FIGS. 4 through 7 illustrate four stages in the operating sequence of the pulse rocket of the invention. As shown in FIG. 4, when the rocket is pulsed (that is, when propellants are injected into the combustion chamber 14), a great amount of pressure is created within the combustion chamber, which is transmitted into the ejection nozzle 30, as shown by pressure pulse 44. As shown in FIG. 5, there is thus created an interface 46 between the propellant and the ambient air in the nozzle and a shock wave 48 both of which travel outwardly toward the open end of the nozzle. Thus, ambient air is expelled from the nozzle at high velocity. When the shock wave front passes out of the nozzle, the pressure within the nozzle falls below atmospheric pressure and ambient air rushes back into the nozzle. This condition is shown in FIG. 6(a) by curve 50. As a result, the pressure at the end of the nozzle nearest the combustion chamber increases, as shown by curve 52 in FIG. 7(b), and the cycle is then repeated.

An important feature of the invention is that the injection mechanism is pulsed at approximately the resonant frequency of the overall system including the relatively long nozzle and the fuel injection mechanism. The pulse repetition rate and the length of the ejection nozzle vary inversely with each other. In other words, as the nozzle length is decreased, the resonant frequency of the pulse rocket increases and hence the pulse frequency must be increased. The converse is also true. In practice, the length of the nozzle is controlled to some extent at the present time by available injection systems, which in general can be pulsed at about 50 cycles per second. This has been found to be a satisfactory frequency.

The length (L) of the nozzle can be determined analytically from the well known equation relating the speed of sound (V) to the pulsing frequency (F) for a ¼ wavelength nozzle, which is a preferred nozzle length. That equation is $$L = V/4F$$

Thus, if the speed of sound is assumed to be approximately 1100 feet per second and the system is pulsed at a frequency of 25 cycles per second, the nozzle would be approximately 11 feet in length from throat to open end. Actually, it has been found that such analytical calculations are not reliable, because of the change in resonant frequency of the system caused by the fuel injection system and the combustion chamber. It is most expedient to measure empirically the resonant frequency of the system including injectors, the combustion chamber and the nozzle to determine the proper pulsing frequency.

FIGS. 8 and 9 are reproductions of oscillograph traces showing the operation of the pulse rocket of the invention. The traces show thrust versus time starting at time zero when the rocket is pulsed. In both figures, the rocket was pulsed at approximately 50 cycles per second, being on for 7 milliseconds and off for 12.5 milliseconds. As shown in FIG. 8, the thrust reached a maximum of approximately 26.5 pounds. In the system whose thrust is indicated in FIG. 9, the fuel input was increased somewhat over the fuel input of the rocket represented in FIG. 8, which resulted in substantially increasing its output thrust.

It is interesting to note in FIG. 9 that the thrust continued to oscillate at a decreasing rate after pulsing had ceased, which occurred at approximately 225 milliseconds. The natural resonant frequency of the system can easily be obtained from observing these post-pulsing or post-firing oscillations.

Although two embodiments of the invention have been shown and described, it is apparent that many changes and modifications may be made therein by one skilled in the art without departing from the true spirit and scope of the invention.

What is claimed is:

1. A pulse rocket having a resonant frequency and comprising:
    a combustion chamber;
    means for supplying a hypergolic fuel, and means for supplying a hypergolic oxidizer;
    an injection system for periodically injecting fuel and oxidizer from said supply means simultaneously into said combustion chamber for combustion therein upon contact with each other;
    an ejection nozzle connected to said combustion chamber for ejection of combustion products and air within said nozzle at the time of combustion; and
    means for operating said injection system to cause combustion of said fuel and oxidizer in said chamber at a frequency substantially the same as said resonant frequency of said rocket;
    said ejection nozzle having a one quarter wave length resulting in a desired value of said resonant frequency.

2. A pulse rocket as defined in claim 1, wherein said injection system comprises a pair of injectors for injecting fuel and oxidizer into said combustion chamber, said operating means comprising actuator means for simultaneously actuating said injectors at said resonant frequency.

3. A pulse rocket as defined in claim 1, wherein said ejection nozzle is of elongated conical shape with its smaller end connecting with said combustion chamber.

4. A pulse rocket as defined in claim 1, wherein said ejection nozzle comprises a conical section connected at its smaller end with said combustion chamber, a cylindrical section and a flared section extending successively outwardly from said combustion chamber.

References Cited

UNITED STATES PATENTS

| | | | |
|---|---|---|---|
| 2,587,100 | 2/1952 | Black et al. | 60—247 |
| 2,825,202 | 3/1958 | Bertin et al. | 60—247 |
| 2,799,137 | 7/1957 | Tenney et al. | 60—207 |
| 3,178,884 | 4/1965 | Boardman | 60—247 |
| 3,251,184 | 4/1966 | Sbarglia et al. | 60—247 |

BENJAMIN R. PADGETT, Primary Examiner

U.S. Cl. X.R.

60—39.77, 207, 211